United States Patent [19]
Blum et al.

[11] Patent Number: 6,107,487
[45] Date of Patent: Aug. 22, 2000

[54] METHINE AND AZAMETHINE DYES BASED ON 5-MEMBERED HETEROCYCLES WITH A TRIFLUOROMETHYL GROUP

[75] Inventors: Rainer Blum, Ludwigshafen; Peter Keller, Spiesen-Elversberg; Thomas Preiss, Ludwigshafen; Jochem Henkelmann, Mannheim, all of Germany

[73] Assignee: BASF Aktiengesellschaft, Ludwigshafen, Germany

[21] Appl. No.: 09/309,587

[22] Filed: May 11, 1999

[30] Foreign Application Priority Data

May 16, 1998 [DE] Germany ............... 198 22 047

[51] Int. Cl.⁷ ............... C09B 23/04; C09B 55/00; D06P 1/13; B41M 1/30
[52] U.S. Cl. ............... 546/209; 548/193; 548/364.7; 548/367.4; 548/371.1; 548/468; 8/471; 8/636; 503/227; 428/195; 428/913; 428/914
[58] Field of Search ............... 546/209; 548/193, 548/364.7, 367.4, 371.1, 468; 8/471, 636; 503/227; 428/195

[56] References Cited

U.S. PATENT DOCUMENTS

| | | | |
|---|---|---|---|
| 4,857,446 | 8/1989 | Diehl et al. ............... | 430/510 |
| 4,945,684 | 8/1990 | Wada et al. ............... | 451/5 |
| 4,975,410 | 12/1990 | Weber et al. ............... | 503/227 |
| 5,132,438 | 7/1992 | Bach et al. ............... | 552/295 |
| 5,266,454 | 11/1993 | Diehl et al. ............... | 430/522 |
| 5,296,944 | 3/1994 | Suzuki et al. ............... | 358/475 |

FOREIGN PATENT DOCUMENTS

| | | |
|---|---|---|
| 0 399 473 A1 | 11/1990 | European Pat. Off. . |
| 0 519 306 A1 | 12/1992 | European Pat. Off. . |
| 0 524 594 A1 | 1/1993 | European Pat. Off. . |
| 63-34537 | 2/1988 | Japan . |
| 63-34538 | 2/1988 | Japan . |
| 6-102624 | 4/1994 | Japan . |
| 88/04974 | 7/1988 | WIPO . |
| 96/35143 A1 | 11/1996 | WIPO . |

OTHER PUBLICATIONS

Chemical Abstracts, abstr. No. 130:126284 & JP 11001067 A2 Jan. 6, 1999, see abstract and compounds RN 185249–26–7, 219952–56–4, 219952–63–3, 219952–65–5, 219952–66–6, 219952–68–8, 219952–69–9, 219952–73–5, 219952–75–7 & 219952–79–1.

Chemical Abstracts, abstr. No. 121:241668 & JP 06138575 A2 May 20, 1994, see abstract and compound RN 158265–44–2.

Chemical Abstracts, abstr. No. 109:83267 & JP 63034538 A2 Feb. 15, 1988, see abstract and compound RN 115756–20–2.

Chemical Abstracts, abstr. No. 109:83266 & JP 63034537 A2 Feb. 15, 1988, see abstract and compound RN 115634–29–2.

*Primary Examiner*—Fiona T. Powers
*Attorney, Agent, or Firm*—Oblon, Spivak, McClelland, Maier & Neustadt, P.C.

[57] ABSTRACT

Dyes of the formula

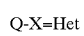

Q-X=Het where

X is nitrogen or CH,

Q is a 5- or 6-membered carbocyclic or heterocyclic radical and Het is a radical of the formula

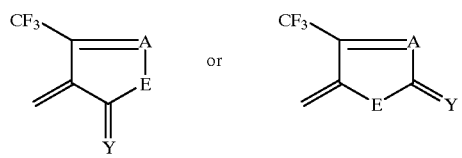

where Y is oxygen, sulfur, imino, $C_1$–$C_4$-alkylimino, substituted or unsubstituted phenylimino or the radical of an acidic-CH compound, A is oxygen or a radical of the formula C—U, where U is as defined in the description part, and E —is oxygen, sulfur, selenium, imino, $C_1$–$C_4$-alkylimino or substituted or unsubstituted phenylimino, are useful for thermal transfer and for dyeing or printing synthetic materials.

9 Claims, No Drawings

METHINE AND AZAMETHINE DYES BASED ON 5-MEMBERED HETEROCYCLES WITH A TRIFLUOROMETHYL GROUP

The present invention relates to novel dyes of the formula I $$Q^1\text{-}X\text{=}Het \quad (I),$$

where

X is nitrogen or CH, $Q^1$ is a radical of the formula IIa to IIl

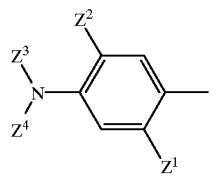
(IIa)

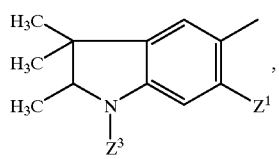
(IIb)

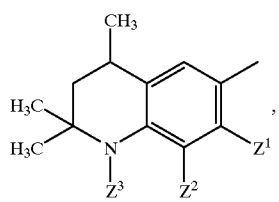
(IIc)

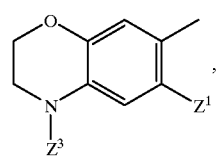
(IId)

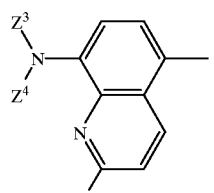
(IIe)

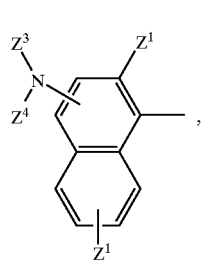
(IIf)

-continued

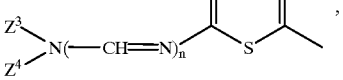
(IIg)

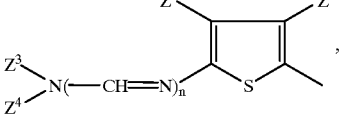
(IIh)

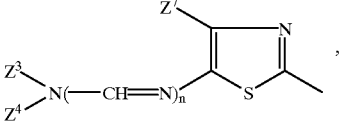
(IIi)

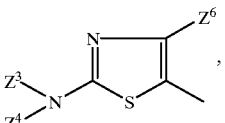
(IIj)

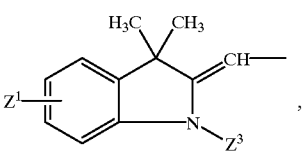
(IIk)

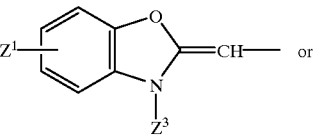
(IIl)

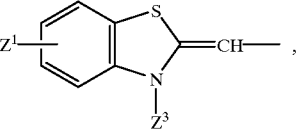

and

Het is a 2-valent radical of the formula III or IV

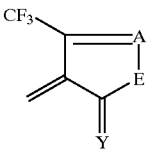
(III)

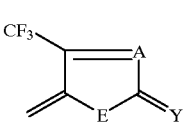
(IV)

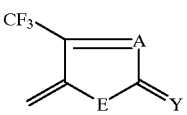

where n is 0 or 1, $Z^1$ is hydrogen, $C_1$–$C_{13}$-alkyl with or without interruption by from 1 to 3 oxygen atoms in ether function, hydroxyl, $C_1$–$C_4$-alkoxy, $C_1$–$C_4$-alkylsulfonylamino, mono- or di-$C_1$–$C_4$-alkylaminosulfonylamino or the radical of the formula —NHCOZ$^8$ or —NHCO$_2$Z$^8$, where $Z^8$ is phenyl, benzyl, tolyl or $C_1$–$C_{13}$-alkyl with or without interruption by from 1 to 3 oxygen atoms in ether function, $Z^2$ is hydrogen, $C_1$–$C_4$-alkyl or $C_1$–$C_4$-alkoxy, $Z^3$ and $Z^4$ are identical or different and each is independently from the other hydrogen, $C_1$–$C_{13}$-alkyl with or without substitution and with or without interruption by from 1 to 3 oxygen atoms in ether function, $C_3$–$C_4$-alkenyl, $C_5$–$C_7$-cycloalkyl, phenyl or tolyl or together with the linking nitrogen atom are a 5- or 6-membered saturated heterocyclic radical with or without further hetero atoms, $Z^5$ is hydrogen or $C_1$–$C_4$-alkyl, $Z^6$ is hydrogen, halogen, $C_1$–$C_{13}$-alkyl, substituted or unsubstituted phenyl, substituted or unsubstituted benzyl, $C_5$–$C_7$-cycloalkyl, thienyl, hydroxyl, $C_1$–$C_4$-alkoxy, $C_1$–$C_4$-alkylthio or $C_1$–$C_{13}$-monoalkylamino, $Z^7$ is hydrogen, $C_1$–$C_{13}$-alkyl, substituted or unsubstituted phenyl, cyano or $C_1$–$C_{13}$-alkoxycarbonyl, Y is oxygen, sulfur, imino, $C_1$–$C_4$-alkylimino, substituted or unsubstituted phenylimino or the radical of an acidic-CH compound, A is nitrogen or a radical of the formula C—U, where U is hydrogen, $C_1$–$C_{13}$-alkyl with or without substitution and with or without interruption by from 1 to 3 oxygen atoms in ether function, halogen, cyano or $C_1$–$C_{13}$-alkoxycarbonyl, and E is oxygen, sulfur, selenium, imino, $C_1$–$C_4$-alkylimino or substituted or unsubstituted phenylimino, to a process for the thermal transfer of such dyes and to a process for dyeing or printing synthetic materials by means of such dyes.

Methine dyes based on trifluoromethylpyrazolinones are known for example from WO-A-4974/1988, U.S. Pat. No. 4,940,654 or EP-A-524 594. The dyes described therein each have water-solubilizing groups in the molecule.

EP-A-519 306 describes a trifluoromethyloxazolinone-based methine dye which likewise has a water-solubilizing group.

It is an object of the present invention to provide novel methine and azamethine dyes having a 5-membered heterocycle with a trifluoromethyl group as central building block which are free of water-solubilizing groups. The novel dyes shall be advantageously suitable for thermal dye transfer and for dyeing and printing synthetic materials.

We have found that this object is achieved by the dyes of the formula I defined at the beginning.

Any alkyl or alkenyl appearing in the abovementioned formulae may be straight-chain or branched.

Any substituted alkyl radicals appearing in the abovementioned formulae may for example have as substituents, unless otherwise stated, cyclohexyl, substituted or unsubstituted phenyl, $C_1$–$C_8$-alkanoyloxy, $C_1$–$C_8$-alkylaminocarbonyloxy, $C_1$–$C_8$-alkoxycarbonyl, $C_1$–$C_8$-alkoxycarbonyloxy, in which case the alkyl chain of the three last radicals is with or without interruption by from 1 to 3 oxygen atoms in ether function and with or without phenyl or phenoxy substitution, cyclohexyloxy, phenoxy, halogen, hydroxyl or cyano. The number of substituents in substituted alkyl is generally 1 or 2.

In any oxygen-interrupted alkyl appearing in the abovementioned formulae, the number of oxygen atoms is, unless otherwise mentioned, preferably 1 or 2.

Any substituted phenyl appearing in the abovementioned formulae may for example have as substituents $C_1$–$C_8$-alkyl, $C_1$–$C_8$-alkoxy, halogen, especially chlorine or bromine, or nitro. The number of substituents in substituted phenyl is generally from 1 to 3.

U, $Z^1$, $Z^2$, $Z^3$, $Z^4$, $Z^5$, $Z^6$, $Z^7$ and $Z^8$ are each suitably for example methyl, ethyl, propyl, isopropyl, butyl, isobutyl, sec-butyl or tert-butyl.

U, $Z^1$, $Z^3$, $Z^4$, $Z^6$, $Z^7$ and $Z^8$ may each also be for example pentyl, isopentyl, neopentyl, tert-pentyl, hexyl, 2-methylpentyl, heptyl, octyl, 2-ethylhexyl, isooctyl, nonyl, isononyl, decyl, isodecyl, undecyl, dodecyl, tridecyl or isotridecyl. [The designations isooctyl, isononyl, isodecyl and isotridecyl are trivial names derived from the alcohols obtained by the oxo process (cf. Ullmann's Encyclopedia of Industrial Chemistry, 5th Edition, Vol. Al, pages 290 to 293, and also Vol. A 10, pages 284 and 285).]

U, $Z^1$, $Z^3$, $Z^4$, and $Z^8$ may each also be for example 2-methoxyethyl, 2-ethoxyethyl, 2-propoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-butoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 4,8-dioxadecyl, 3,6,9-trioxadecyl or 3,6,9-trioxaundecyl.

$Z^1$, $Z^2$ and $Z^6$ may each also be for example methoxy, ethoxy, propoxy, isopropoxy, butoxy, isobutoxy or sec-butoxy.

$Z^6$ and $Z^7$ may each also be for example phenyl, 2-, 3- or 4-methylphenyl, 2-, 3- or 4-ethylphenyl, 2-, 3- or 4propylphenyl, 2-, 3- or 4-isopropylphenyl, 2-, 3- or 4-butylphenyl, 2,4dimethylphenyl, 2-, 3- or 4-methoxyphenyl, 2-, 3- or 4-ethoxyphenyl, 2-, 3- or 4-isobutoxyphenyl, 2,4-dimethoxyphenyl, 2-, 3or 4-chlorophenyl, 2,6-dichlorophenyl or 2-, 3- or 4-nitrophenyl.

$Z^3$, $Z^4$ and $Z^6$ may each also be for example cyclopentyl, cyclohexyl or cycloheptyl.

U, $Z^3$ and $Z^4$ may each also be for example benzyl, 2-methylbenzyl, 1- or 2-phenylethyl, 2-hydroxyethyl, 2- or 3-hydroxypropyl, 2-cyanoethyl, 2- or 3-cyanopropyl, 2-acetyloxyethyl, 2- or 3-acetyloxypropyl, 2-isobutyryloxyethyl, 2- or 3-isobutyryloxypropyl, 2-methoxycarbonylethyl, 2- or 3-methoxycarbonylpropyl, 2-ethoxycarbonylethyl, 2- or 3-ethoxycarbonylpropyl, 2-methoxycarbonyloxyethyl, 2- or 3-methoxycarbonyloxypropyl, 2-ethoxycarbonyloxyethyl, 2- or 3-ethoxycarbonyloxypropyl, 2-butoxycarbonyloxyethyl, 2- or 3-butoxycarbonyloxypropyl, 2-(2-phenylethoxycarbonyloxy)ethyl, 2- or 3-(2-phenylethoxycarbonyloxy)propyl, 2-(2-ethoxyethoxycarbonyloxy)ethyl or 2- or 3-(2-ethoxyethoxycarbonyloxy)propyl.

$Z^1$ may also be for example methylsulfonylamino, ethylsulfonylamino, propylsulfonylamino, isopropylsulfonylamino, butylsulfonylamino, mono- or dimethylaminosulfonylamino, mono- or diethylaminosulfonylamino, mono- or dipropylaminosulfonylamino, mono- or diisopropylaminosulfonylamino, mono- or dibutylaminosulfonylamino or (N-methyl-N-ethylaminosulfonyl)amino.

$Z^6$ may also be for example benzyl, 2-methylbenzyl, 2,4-dimethylbenzyl, 2-methoxybenzyl, 2,4-dimethoxybenzyl, methylamino, ethylamino, propylamino, isopropylamino, butylamino, pentylamino, hexylamino, heptylamino, octylamino, 2-ethylhexylamino, methylthio, ethylthio, propylthio, isopropylthio or butylthio.

U and $Z^6$ may each also be for example fluorine, chlorine or bromine.

$Z^3$ and $Z^4$ may each also be for example allyl or methallyl.

U and $Z^7$ may each also be for example methoxycarbonyl, ethoxycarbonyl, propoxycarbonyl, isopropoxycarbonyl, butoxycarbonyl, pentyloxy-carbonyl, hexyloxycarbonyl, heptyloxycarbonyl, octyloxycarbonyl or 2-ethylhexyloxycarbonyl.

$Z^3$ and $Z^4$ combining with the linking nitrogen atom to form a 5- or 6-membered saturated heterocyclic radical with or without further hetero atoms can be for example pyrrolidinyl, piperidinyl, morpholinyl, piperazinyl or N-($C_1$–$C_4$-alkyl)piperazinyl.

Y and E are each for example methylimino, ethylimino, propylimino, isopropylimino, butylimino, isobutylimino, sec-butylimino, tert-butylimino, phenylimino, 2-, 3- or 4-methylphenylimino, 2-, 3- or 4-ethylphenylimino, 2-, 3- or 4-propylphenylimino, 2-, 3-or 4-isopropylphenylimino, 2-, 3- or 4-butylphenylimino, 2,4-dimethylphenylimino, 2-, 3- or 4-methoxyphenylimino, 2-, 3 - or 4-ethoxyphenylimino, 2-, 3- or 4-isobutoxyphenylimino, 2,4-dimethoxyphenylimino, 2-, 3- or 4-chlorophenylimino, 2,6-dichlorophenylimino, 2-, 3- or 4-nitrophenylimino.

For Y the radical of an acidic-CH compound, suitable acidic-CH compounds include for example compounds of the formula

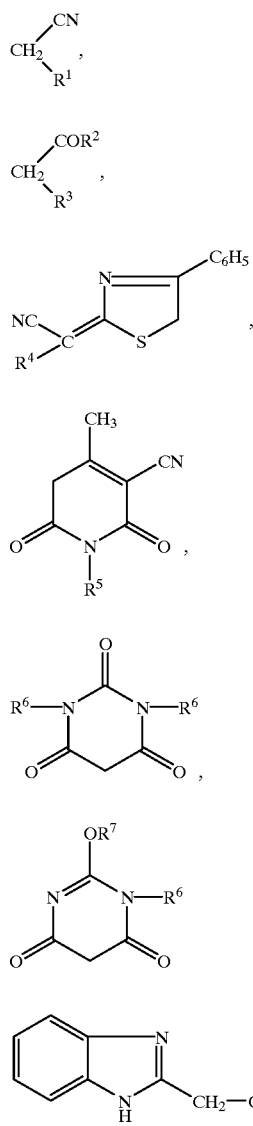

where $R^1$ is cyano, nitro, $C_1$–$C_6$-alkanoyl, unsubstituted or $C_1$–$C_4$-alkyl-, $C_1$–$C_4$-alkoxy-, halogen- or nitro-substituted benzoyl, $C_1$–$C_8$-alkylsulfonyl, unsubstituted or $C_1$–$C_4$-alkyl-, $C_1$–$C_4$-alkoxy-, halogen- or nitro-substituted phenylsulfonyl, $C_1$–$C_8$-alkoxycarbonyl, $C_3$–$C_4$-alkenyloxycarbonyl, phenoxycarbonyl, carbamoyl, mono- or di-$C_1$–$C_4$-alkylcarbamoyl, unsubstituted or $C_1$–$C_4$-alkyl-, $C_1$–$C_4$-alkoxy-, halogen- or nitro-substituted phenylcarbamoyl, unsubstituted or $C_1$–$C_4$-alkyl-, $C_1$–$C_4$-alkoxy-, halogen- or nitro-substituted phenyl, benzothiazol-2-yl, benzimidazol-2-yl, 5-phenyl-1,3,4-thiadiazol-2-yl or 2-hydroxyquinoxalin-3-yl, $R^2$ is $C_1$–$C_6$-alkyl, $C_1$–$C_6$-alkoxy or $C_3$–$C_4$-alkenyloxy, $R^3$ is $C_1$–$C_8$-alkoxycarbonyl, $C_3$–$C_4$-alkenyloxycarbonyl, phenylcarbamoyl or benzimidazol-2-yl, $R^4$ is cyano, $C_1$–$C_8$-alkoxycarbonyl or $C_3$–$C_4$-alkenyloxycarbonyl, $R^5$ is hydrogen or $C_1$–$C_6$-alkyl, $R^6$ is hydrogen, $C_1$–$C_6$-alkyl or phenyl and $R^7$ is $C_1$–$C_6$-alkyl.

The radical derived from compounds of the formula Va, Vb or Vc where $R^1$ is cyano, $C_1$–$C_4$-alkanoyl, $C_1$–$C_8$-alkoxycarbonyl or $C_3$–$C_4$-alkenyloxycarbonyl, $R^2$ is $C_1$–$C_4$-alkyl, $C_1$–$C_4$-alkoxy or $C_3$–$C_4$-alkenyloxy, $R^3$ is $C_1$–$C_4$-alkoxycarbonyl or $C_3$–$C_4$-alkenyloxycarbonyl and $R^4$ is cyano is noteworthy.

Particularly noteworthy is the radical derived from compounds of the formula Va, Vb or Vc where $R^1$ is cyano, $C_1$–$C_8$-alkoxycarbonyl or $C_3$–$C_4$-alkenyloxycarbonyl, $R^2$ is $C_1$–$C_4$-alkoxy or $C_2$–$C_4$-alkenyloxy, $R^3$ is $C_1$–$C_4$-alkoxycarbonyl or $C_3$–$C_4$-alkenyloxycarbonyl and $R^4$ is cyano.

Preference is given to dyes of the formula I where $Q^1$ is a radical of the formula IIa, IIi or IIj, especially a radical of the formula IIi or IIj.

When $Q^1$ is a radical of the formula IIa, X is preferably nitrogen.

When $Q^1$ is a radical of the formula IIi or IIj, X is preferably CH.

Preference is further given to dyes of the formula I where Het is a radical of the formula III, especially of the formula IIIa

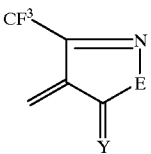

(IIIa)

where E is $C_1$–$C_4$-alkylimino or substituted or unsubstituted phenylimino and Y is as defined above, and the dyes of the formula IIIa where Y is oxygen have particular significance.

Preference is further given to dyes of the formula I where Het is a radical of the formula IIIb

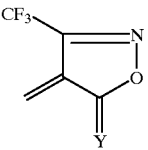

(IIIb)

where Y is as defined above, but especially is oxygen.

Preference is further given to dyes of the formula I where Het is a radical of the formula IVa

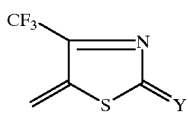

(IVa)

where Y is as defined above, but especially is oxygen.

Preference is also given to dyes of the formula I where the substituents are selected from a combination of the above-recited preferred substituents.

The dyes of the formula I according to the invention are preparable in a conventional manner.

For instance, those dyes of the formula I where X is CH can be obtained by condensation of aldehydes of the formula VI $$Q^1\text{-CHO} \qquad (VI),$$

where $Q^1$ is as defined above, with trifluoromethyl heterocycles of the formula VII $$H_2\text{Het} \qquad (VII),$$

where Het is as defined above.

Those dyes of the formula I where X is nitrogen are obtainable for example by condensation of nitroso compounds of the formula VIII $$Q^1\text{-NO} \qquad (VIII),$$

where $Q^1$ is as defined above, or by oxidative coupling of amino compounds of the formula IX $$Q^1\text{-NH}^2 \qquad (IX),$$

where $Q^1$ is as defined above, with the trifluoromethyl heterocycles VII.

The intermediates for preparing the novel dyes are generally compounds known per se.

The present invention further provides a process for transferring dyes from a support to a polymer coated paper by diffusion or sublimation with the aid of an energy source, which comprises using a support on which there are located one or more dyes of the formula Ia $$Q^2\text{-X=Het} \qquad (Ia),$$

where $Q^2$ is a 5- or 6-membered carbocyclic radical or heterocyclic radical, especially a radical of the formula $Q^1$, and X and Het are each as defined above.

To make the transfers required for the process of the present invention, the dyes of the formula Ia are incorporated in a suitable organic solvent or in mixtures of solvents with one or more binders, in the presence or absence of assistants, to form a printing ink. This printing ink preferably includes the dyes of the formula Ia in a molecularly disperse, i.e. dissolved, form. The printing ink can be applied to the inert support by means of a doctor blade and dried for example in the air or using a blow dryer. Suitable organic solvents for the dyes of the formula Ia include for example those in which the solubility of the dyes of the formula I is greater than 1% by weight, preferably greater than 5% by weight, at 20° C.

Examples are ethanol, propanol, isobutanol, tetrahydrofuran, methylene chloride, methyl ethyl ketone, cyclopentanone, cyclohexanone, toluene, chlorobenzene or mixtures thereof.

Suitable binders include all resins or polymer materials which are soluble in organic solvents and which are capable of binding the dyes to the inert support sufficiently firmly to prevent rubbing off. Preference is here given to those binders which, after the air drying of the printing ink, include the dyes in the form of a clear, transparent film without any visible sign of crystallization of the dyes.

Such binders are mentioned for example in U.S. Pat. No. 5,132,438 or the pertinent patent applications cited therein. Also suitable are saturated linear polyesters.

Preferred binders include ethylcellulose, ethylhydroxyethylcellulose, polyvinyl butyral, polyvinyl acetate, cellulose propionate or saturated linear polyesters.

The weight ratio of binder:dye is generally within the range from 1:1 to 10:1.

Suitable assistants include for example release agents as mentioned in U.S. Pat. No. 5,132,438 or the pertinent patent applications cited therein. Also suitable are in particular organic additives which prevent the crystallizing out of the transfer dyes in the course of storage or in heating the ink ribbon, for example cholesterol or vanillin.

Suitable inert supports are described for example in U.S. Pat. No. 5,132,438 or in the pertinent patent applications cited therein. The thickness of the support is generally within the range from 3 to 30 µm.

Suitable dye receiver layers include generally all thermally stable polymer layers with affinity for the dyes to be transferred, for example modified polycarbonates or polyesters. Further details can be found for example in U.S. Pat. No. 5,132,438 or the pertinent patent applications cited therein.

Transfer is effected by means of an energy source, for example by means of a laser or a thermal head, the latter having to be heatable to a temperature of ≧300° C. in order that the dye transfer may take place within the time range t: 0<t<15 msec. In the course of transfer, the dye migrates out of the transfer sheet and diffuses into the surface coating of the receiving medium.

The dyes of the formula Ia according to the invention are notable for advantageous application properties in dye transfer. They exhibit high solubility in the ink ribbon (good compatibility with the binder), high stability in the printing ink, good transferability, good image stability (i.e., good lightfastness and also good stability to environmental effects, for example moisture, temperature or chemicals) and permit flexible coloristic adaptation to given subtractive primary colors as part of an optimal trichromat (highest possible brilliance of primary or secondary colors and deep neutral black).

It was also found that synthetic materials can be advantageously dyed or printed (including by the ink-jet process) by treating them with one or more of the dyes of the formula Ia. Synthetic materials include for example polyesters, cellulose esters, polyamides or polycarbonates. Of particular note are materials in textile form, such as fibers, yarns, threads, knits, wovens or nonwovens composed of polyester, modified polyester, for example anionically modified polyester, blends of polyester with cellulose, cotton, viscose or wool, or polyamide. The dyeing and printing conditions are known per se and include dyeing from supercritical carbon dioxide. The dyeings or prints obtained have high lightfastness, high brilliance and very good wetfastness properties, for example very good wash- or perspirationfastness.

The dyes of the formula Ia can also be used for dyeing keratinous fibers, for example in hair dyeing or the dyeing of furs.

The novel dyes of the formula I are further advantageously useful for manufacturing color filters as described for example in EP-A-399 473.

Finally, they are also advantageously useful as colorants for the preparation of toners for electrophotography and also in nonlinear optics and for photorefractive materials.

In the fields of application mentioned, preference is given to using dyes of the formula Ia where $Q^1$ is a radical of the formula IIa, IIi or IIj, especially a radical of the formula IIi or IIj.

When $Q^1$ is a radical of the formula IIa, X is preferably nitrogen.

When $Q^1$ is a radical of the formula IIi or IIj, X is preferably CH.

In the fields of application mentioned, preference is further given to using dyes of the formula Ia where Het is a radical of the formula III, especially of the formula IIIa

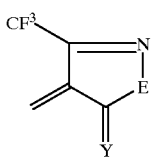

(IIIa)

where E is $C_1$–$C_4$-alkylimino or substituted or unsubstituted phenylimino and Y is as defined above, the dyes of the formula IIIa where Y is oxygen being of particular importance.

In the novel fields of application mentioned, preference is further given to using dyes of the formula Ia where Het is a radical of the formula IIIb

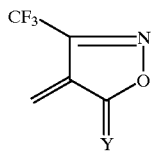

(IIIb)

where Y is as defined above, especially oxygen.

In the fields of application mentioned, preference is further given to using dyes of the formula Ia where Het is a radical of the formula IVa

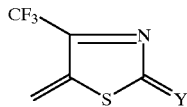

(IVa)

where Y is as defined above, but especially oxygen.

The Examples which follow illustrate the invention.

A) Preparation

EXAMPLE 1

0.98 g (5 mmol) of 2-formyl-5-piperidinothiophene and 0.83 g (5 mmol) of 1-methyl-3-trifluoromethyl-2-pyrazolin-5-one were dissolved in 20 ml of ethanol, 2 drops of piperidine were added, and the mixture was heated at the boil for 2 h. The solvent was then distilled off and the resulting dye was purified by chromatography over silica gel.

Mobile phase: toluene/ethyl acetate. 0.75 g of the dye of the formula

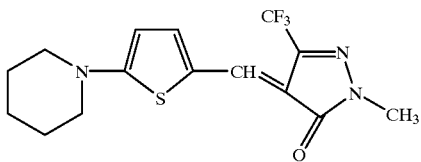

were obtained.

Melting point: 195–196° C.

UV/VIS ($CH_2Cl_2$): $\lambda$=522 nm $\epsilon$max=53,000 $lmol^{-1}cm^{-1}$

EXAMPLE 2

1.6 g (5 mmol) of 2-dibutylamino-4-phenyl-5-formylthiazole and 1.16 g (5 mmol) of 1-phenyl-3-trifluoromethyl-2-pyrazolin-5-one in 2 ml of acetic anhydride were heated to 90° C. for 30 min. This was followed by cooling down to room temperature. The precipitated dye was filtered off, washed with ethanol and dried at 50° C. in a vacuum drying cabinet leaving 1.24 g (47% of theory) of the dye of the formula

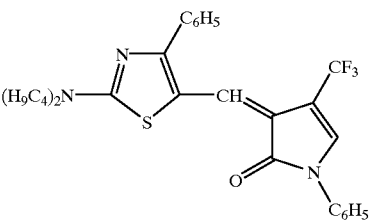

UV/VIS ($CH_2Cl_2$): $\lambda$max=506 nm $\epsilon$max=41,000 $lmol^{-1}cm^{-1}$

EXAMPLE 3

1.0 g (5 mmol) of 1,3,3-trimethyl-2-(formylmethylene) indoline of the formula

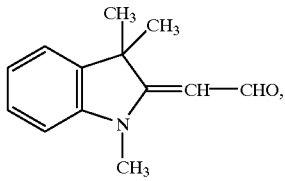

1.16 g (5 mmol) of 1-phenyl-3-trifluoromethylpyrazolin-5-one and 1 ml of acetic anhydride were heated to 90–100° C. for 15 min, cooled down and stirred up with 10 ml of isopropanol. Removal by filtration, washing with a little isopropanol and drying in a vacuum drying cabinet at 50° C. left 1.8 g (87% of theory) of a reddish orange dye of the formula

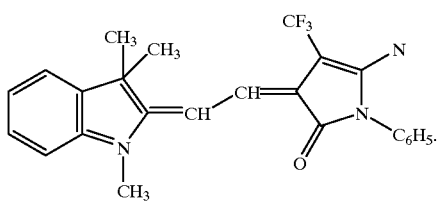

UV/VIS (CH$_2$Cl$_2$): λmax=488 nm

δmax=58,500 lmol$^{-1}$cm$^{-1}$

The method of Example 3 was also used to prepare the dyes recited in Table 1.

TABLE 1

| Example No. | Reactant 1 | Reactant 2 | Product | Characterization |
|---|---|---|---|---|
| 4 | 4-dibutylamino-benzaldehyde | 1-(4-methyl-phenyl)-3-trifluoro-methylpyrazolin-5-one | | UV/VIS (CH$_2$Cl$_2$): λmax = 500 nm |
| 5 | 1,3,3-trimethyl-2-(formyl-methylene)-indoline | 1-(4-nitro-phenyl)-3-tri-fluoromethyl-pyrazolin-5-one | | m.p.: 234° C. UV/VIS (CH$_2$Cl$_2$): λmax = 502 nm εmax = 69,000 lmol$^{-1}$ cm |
| 6 | 2-dibutylamino-4-phenyl-5-formylthiazole | as in Ex. 5 | | m.p.: 230° C. UV/VIS (CH$_2$Cl$_2$): λmax = 518 nm εmax = 52,000 lmol$^{-1}$ cm |
| 7 | as in Ex. 5 | 1-(4-nitro-phenyl)-3-tri-fluoromethyl-pyrazolin-5-one | | m.p.: 229° C. UV/VIS (CH$_2$Cl$_2$): λmax = 488 nm εmax = 56,000 lmol$^{-1}$ cm |

TABLE 1-continued

| Example No. | Reactant 1 | Reactant 2 | Product | Characterization |
|---|---|---|---|---|
| 8 | as in Ex. 6 | as in Ex. 7 | ![structure] | m.p.: 155° C.<br>UV/VIS (CH$_2$Cl$_2$):<br>λmax = 506 nm<br>εmax = 38,000 lmol$^{-1}$ cm |
| 9 | as in Ex. 5 | 1,3-dimethyl-2-pyrazolin-5-one | ![structure] | UV/VIS (CH$_2$Cl$_2$):<br>λmax = 488 nm<br>εmax = 54,000 lmol$^{-1}$ cm |
| 10 | as in Ex. 6 | as in Ex. 9 | ![structure] | UV/VIS (CH$_2$Cl$_2$):<br>λmax = 502 nm |

EXAMPLE 11

1.85 g (10 nmmol) of 1-diethylamino-4-nitrosobenzene and 1.66 g (10 mmol) of 1-methyl-3-trifluoromethyl-2-pyrazolin-5-one were placed in 3 ml of toluene, 3 drops of piperidine were added and the mixture was heated to 115° C. for 15 min. After cooling to room temperature, the precipitated solid was filtered off, washed with a little toluene and dried in a vacuum drying cabinet to leave 1.3 g of dye which was dissolved in 95:5 toluene/methanol and chromatographed over a silica gel column.

Yield: 0.75 g of violet dye of the formula

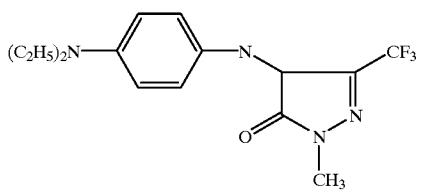

m.p.: 172° C.
UV/VIS (CH$_2$Cl$_2$):
λmax = 556 nm
εmax = 45,000 lmol$^{-1}$cm

The method of Example 11 was also used to prepare the dyes recited in Table 2.

TABLE 2

| Example No. | Reactant 1 | Reactant 2 | Product | Characterization |
|---|---|---|---|---|
| 12 | as in Ex. | as in Ex. 3 | (C$_2$H$_5$)$_2$N—C$_6$H$_4$—CH=pyrazolinone with CF$_3$, N, C$_6$H$_5$ | m.p.: 136° C.<br>UV/VIS (CH$_2$Cl$_2$):<br>λmax = 562 nm<br>εmax = 50,000 lmol$^{-1}$ cm |
| 13 | 4-(diethyl-amino)-2-methyl-1-nitrobenzene | as in Ex. 3 | (C$_2$H$_5$)$_2$N—(2-methylphenyl)—N=pyrazolinone with CF$_3$, N, C$_6$H$_5$ | |

The comparative compounds recited in Table 3 were prepared similarly to Example 3

TABLE 3

| Comparative Example No. | Reactant 1 | Reactant 2 | Product | Characterization |
|---|---|---|---|---|
| C1 | as in Ex. 5 | 3-methyl-1-phenyl-2-pyrazolin-5-one | indoline=CH—CH=pyrazolinone, CH$_3$, CH$_3$, CH$_3$, C$_6$H$_5$, N-CH$_3$ | UV/VIS (CH$_2$Cl$_2$):<br>λmax = 468 nm<br>εmax = 47,000 lmol$^{-1}$ cm |
| C2 | as in Ex. 6 | as in Comparative Example C1 | (C$_4$H$_9$)$_2$N—thiazole(Ph)—CH=pyrazolinone, CH$_3$, C$_6$H$_5$ | UV/VIS (CH$_2$Cl$_2$):<br>λmax = 475 nm |
| C3 | as in Ex. 5 | 1,3-dimethyl-2-pyrazolin-5-one | indoline=CH—CH=pyrazolinone, H$_3$C, CH$_3$, CH$_3$, CH$_3$, N-CH$_3$ | m.p.: 182° C.<br>UV/VIS (CH$_2$Cl$_2$):<br>λmax = 466 nm<br>εmax = 35,000 lmol$^{-1}$ cm |
| C4 | as in Ex. 6 | 3-phenyl-5-isoxazol-5-one | (C$_4$H$_9$)$_2$N—thiazole(C$_6$H$_5$)—CH=isoxazolone, C$_6$H$_5$ | m.p.: 168° C.<br>UV/VIS (CH$_2$Cl$_2$):<br>λmax = 492 nm<br>εmax = 44,000 lmol$^{-1}$ cm |

B) Dye transfer

General method:

a) 10 g of dye are stirred, if necessary with brief heating to 80–90° C., into 100 g of a 10% strength by weight solution of a binder in 4.5:2:2 (v/v/v) methyl ethyl ketone/toluene/cyclohexanone.

The resulting printing ink is applied with a 6 μm knife to a polyester film 6 μm in thickness which has a suitable slipping layer on the back and is blown dry with a blow dryer in the course of 1 minute. Before the ink ribbon can be printed, it has to be air dried for at least a further 24 hours, since solvent residues can impair the printing process.

b) The ink ribbons are printed on an experimental computer-controlled apparatus equipped with a commercial thermal head onto commercial video print paper (type VY-S from Hitachi).

The energy emitted by the thermal head is controlled by changing the voltage, the length of pulse having been set to 7 ms and only one pulse being emitted at a time. The emitted energy ranges from 0.7 to 2.0 mJ/dot.

Since the depth of color is directly proportional to the energy supplied, it is possible to produce a color wedge for spectroscopic evaluation.

The plot of the depth of color against the supplied energy per heating element is evaluated to determine the Q* value (=energy in mJ for an absorbance value of 1).

The results obtained are recited in Table 4 below.

(The first of the pair of Q* figures reported for each dye relates to a binder based on polyester, the second to a binder based on polyvinyl butyral.)

TABLE 4

| Dye No. | Q* [mJ/dot] |
|---|---|
| 1 | 0.75 |
|   | 0.78 |
| 2 | 1.09 |
|   | 1.15 |
| 3 | 0.85 |
|   | 0.93 |
| 6 | 1.12 |
|   | 1.74 |
| 7 | 0.83 |
|   | 0.97 |
| 8 | 1.07 |
|   | 1.19 |
| 9 | 0.95 |
|   | 0.81 |
| 10 | 1.05 |
|   | 1.13 |
| 11 | 0.89 |
|   | 0.85 |
| 12 | 0.82 |
|   | 0.81 |

C) Dyeing method

Woven polyester fabric is introduced at 55OC into a dyebath containing 0.5% of dye (on weight of fiber), 1 g/l of the sodium salt of a condensation product of naphthalene-2-sulfonic acid and formaldehyde and 0.5 ml/l of buffer solution (pH 4.5). The bath is then heated to 130° C. over 30 min and maintained at that temperature for a further 60 min.

After cooling and rinsing, the fabric is reduction cleared in a bath containing 4 g/l of 32% strength by weight sodium hydroxide solution, 2 g/l of sodium dithionite and 1 g/l of an addition product of 12 mol of ethylene oxide with 1 mol of oleylamine at 70° C. for 30 min and then rinsed and dried.

The results obtained are shown in Table 5. The lightfastness was determined according to DIN 54 004.

| Dye No. | Color | Lightfastness |
|---|---|---|
| 1 | pink | 4–5 |
| 8 | brilliant red | 5 |
| 6 | reddish pink | 6 |
| 7 | brilliant orange | 6 |
| 9 | brilliant orange | 6 |
| 11 | violet | 4–5 |
| C1 | matte orange | 3–4 |
| C2 | matte orange | 2 |
| C3 | matte pale orange | 3 |

We claim:

1. A dye of the formula I $$Q^1\text{-}X\text{=}Het \qquad (I),$$

where

X is nitrogen or CH, $Q^1$ is a radical of the formula IIa to III

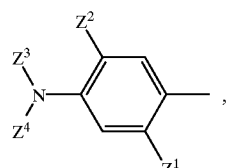

(IIa)

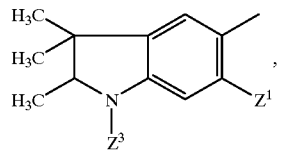

(IIb)

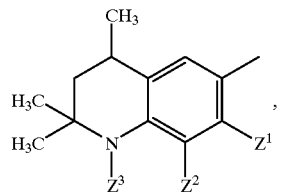

(IIc)

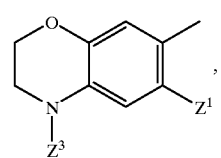

(IId)

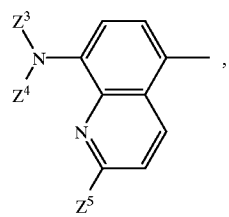

(IIe)

-continued

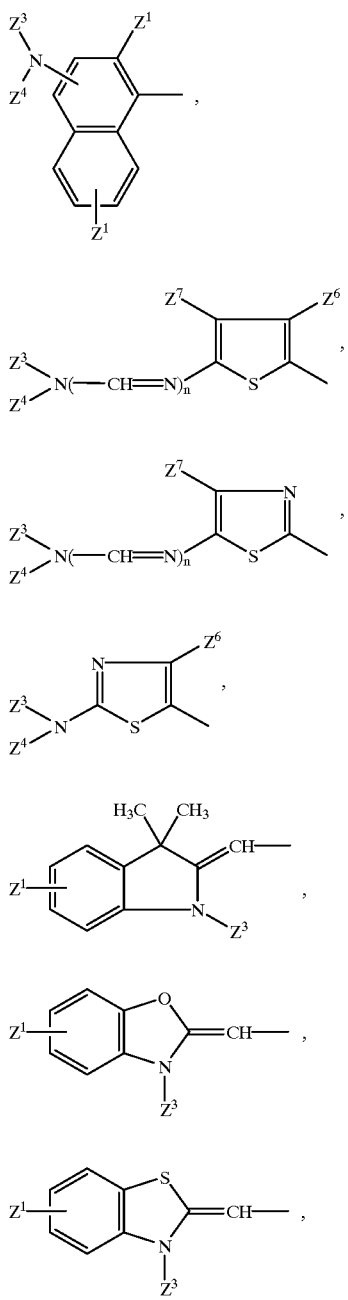

and

Het is a 2-valent radical of the formula III or IV

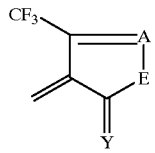

-continued

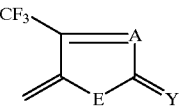

where n is 0 or 1, $Z^1$ is hydrogen, $C_1$–$C_{13}$-alkyl with or without interruption by from 1 to 3 oxygen atoms in ether function, hydroxyl, $C_1$–$C_4$-alkoxy, $C_1$–$C_4$-alkylsulfonylamino, mono- or di-$C_1$–$C_4$-alkylaminosulfonylamino or the radical of the formula —NHCOZ$^8$ or —NHCO$_2$Z$^8$, where $Z^8$ is phenyl, benzyl, tolyl or $C_1$–$C_{13}$-alkyl with or without interruption by from 1 to 3 carbon atoms in ether function, $Z^2$ is hydrogen, $C_1$–$C_4$-alkyl or $C_1$–$C_4$-alkoxy, $Z^3$ and $Z^4$ are identical or different and each is independently from the other hydrogen, $C_1$–$C_{13}$-alkyl with or without substitution and with or without interruption by from 1 to 3 oxygen atoms in ether function, $C_3$–$C_4$-alkenyl, $C_5$–$C_7$-cycloalkyl, phenyl or tolyl or together with the linking nitrogen atom are a 5- or 6-membered saturated heterocyclic radical with or without further hetero atoms, $Z^5$ is hydrogen or $C_1$–$C_4$-alkyl, $Z^6$ is hydrogen, halogen, $C_1$–$C_{13}$-alkyl, substituted or unsubstituted phenyl, substituted or unsubstituted benzyl, $C_5$–$C_7$-cycloalkyl, thienyl, hydroxyl, $C_1$–$C_4$-alkoxy, $C_1$–$C_4$-alkylthio or $C_1$–$C_{13}$-monoalkylamino, $Z^7$ is hydrogen, $C_1$–$C_{13}$-alkyl, substituted or unsubstituted phenyl, cyano or $C_1$–$C_{13}$-alkoxycarbonyl, Y is oxygen, sulfur, imino, $C_1$–$C_4$-alkylimino, substituted or unsubstituted phenylimino or the radical of an acidic-CH compound, A is nitrogen or a radical of the formula C—U, where U is hydrogen, $C_1$–$C_{13}$alkyl with or without substitution and with or without interruption by from 1 to 3 oxygen atoms in ether function, halogen, cyano or $C_1$–$C_{13}$-alkoxy-carbonyl, and E is oxygen, sulfur, selenium, imino, $C_2$–$C_4$-alkylimino or substituted or unsubstituted phenylimino, wherein when $Q^1$ is a radical of the formula IIk or III, substituted phenylimino for E is 2-, 3- or 4-methylphenylimino, 2-, 3- or 4-ethylphenylimino, 2-, 3- or 4-propylphenylimino, 2-, 3- or 4-isopropylphenylimino, 2-, 3- or 4-butylphenylimino, 2,4-dimethylphenylimino, 2-, 3-or 4-methoxyphenylimino, 2-, 3- or 4-ethoxyphenylimino, 2-, 3- or 4-isobutoxyphenylimino, 2,4-dimethoxyphenylimino, 2-, 3- or 4-chlorophenylimino, 2,6-dichlorophenylimino, 2-, 3- or 4-nitrophenylimino, and wherein when $Q^1$ is a radical of the formula IIa and Het is of formula III, E is oxygen, sulfur, selenium, or imino.

2. The dye as claimed in claim 1, wherein $Q^1$ is a radical of the formula IIa, IIi or IIj.

3. The dye as claimed in claim 1, wherein $Q^1$ is a radical of the formula IIi or IIj.

4. The dye as claimed in claim 1, wherein Het is a radical of the formula III.

5. The dye as claimed in claim 1, wherein Het is a radical of the formula III a

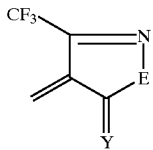

(IIIa)

where
E is $C_1$–$C_4$-alkylimino or substituted or unsubstituted phenylimino and Y is as defined in claim 1.

6. The dye as claimed in claim 1, wherein Het is a radical of the formula III b

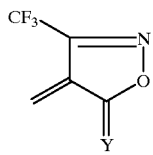

(IIIb)

where Y is as defined in claim 1.

7. The dye as claimed in claim 1, wherein Het is a radical of the formula IV a

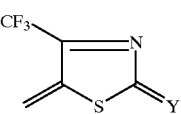

(IVa)

where Y is as defined in claim 1.

8. A process for transferring dyes from a support to a polymer coated paper by diffusion or sublimination with the aid of an energy source, which comprises using a support on which there are located one or more dyes as claimed in claim 1.

9. A process for dyeing or printing synthetic materials, which comprises treating the synthetic materials with one or more dyes as claimed in claim 1.

* * * * *